United States Patent
Agapiou

(10) Patent No.: US 10,112,869 B2
(45) Date of Patent: Oct. 30, 2018

(54) HIGH-ALUMINA REFRACTORY ALUMINOSILICATE POZZOLAN IN WELL CEMENTING

(71) Applicant: Halliburton Energy Services, Inc., Houston, TX (US)

(72) Inventor: Kyriacos Agapiou, Houston, TX (US)

(73) Assignee: Halliburton Enegry Services, Inc., Houston, TX (US)

( * ) Notice: Subject to any disclaimer, the term of this patent is extended or adjusted under 35 U.S.C. 154(b) by 0 days.

(21) Appl. No.: 15/113,182

(22) PCT Filed: Feb. 26, 2014

(86) PCT No.: PCT/US2014/018575
§ 371 (c)(1),
(2) Date: Jul. 21, 2016

(87) PCT Pub. No.: WO2015/130271
PCT Pub. Date: Sep. 3, 2015

(65) Prior Publication Data
US 2017/0001908 A1    Jan. 5, 2017

(51) Int. Cl.
*E21B 33/14* (2006.01)
*C04B 28/06* (2006.01)
(Continued)

(52) U.S. Cl.
CPC .............. *C04B 28/06* (2013.01); *C04B 28/04* (2013.01); *C09K 8/46* (2013.01); *C09K 8/467* (2013.01);
(Continued)

(58) Field of Classification Search
CPC .......... C04B 28/06; C04B 28/04; C09K 8/43; C09K 8/467; C09K 8/473; C09K 8/487; E21B 33/14; Y02W 30/95
(Continued)

(56) References Cited

U.S. PATENT DOCUMENTS 3,180,748 A    4/1965  Holmgren et al.
3,557,876 A *  1/1971  Tragesser ................. C09K 8/05
                                                166/292
(Continued)

FOREIGN PATENT DOCUMENTS

DE    259412 A    8/1988
GB    2387593     10/2003
(Continued)

OTHER PUBLICATIONS

Australian Patent Examination Report No. 1 for Australian Patent Application No. 2014384674 dated Sep. 22, 2016.
(Continued)

*Primary Examiner* — Silvana C Runyan
(74) *Attorney, Agent, or Firm* — Craig W. Roddy; Tumey L.L.P.

(57) ABSTRACT

Methods and compositions are provided that utilize high-alumina refractory aluminosilicate pozzolans in well cementing. An embodiment discloses a method of cementing comprising: introducing a cement composition into a subterranean formation, wherein the cement composition comprises: a component selected from the group consisting of cement kiln dust, Portland cement, and any combination thereof; a high-alumina refractory aluminosilicate pozzolan; and water; and allowing the cement composition to set.

16 Claims, 3 Drawing Sheets

(51) Int. Cl.
  *C09K 8/46* (2006.01)
  *C04B 28/04* (2006.01)
  *C09K 8/473* (2006.01)
  *C09K 8/487* (2006.01)
  *C09K 8/467* (2006.01)

(52) U.S. Cl.
  CPC .............. *C09K 8/473* (2013.01); *C09K 8/487* (2013.01); *E21B 33/14* (2013.01); *Y02W 30/95* (2015.05)

(58) Field of Classification Search
  USPC ........................................................ 166/293
  See application file for complete search history.

(56) References Cited

U.S. PATENT DOCUMENTS

| | | | |
|---|---|---|---|
| 5,352,288 A | 10/1994 | Mallow | |
| 5,626,665 A | 5/1997 | Barger et al. | |
| 5,671,581 A | 9/1997 | Nagahama | |
| 6,176,607 B1 | 1/2001 | Hajianpour | |
| 6,332,921 B1* | 12/2001 | Brothers | C04B 28/06 |
| | | | 106/696 |
| 6,488,763 B2 | 12/2002 | Brothers et al. | |
| 7,631,692 B2 | 12/2009 | Roddy et al. | |
| 8,557,036 B1 | 10/2013 | Chatterji et al. | |
| 8,899,329 B2 | 12/2014 | Chatterji et al. | |
| 2004/0211562 A1* | 10/2004 | Brothers | C04B 14/108 |
| | | | 166/281 |
| 2007/0056734 A1 | 3/2007 | Roddy et al. | |
| 2007/0235192 A1 | 10/2007 | Michaux et al. | |
| 2011/0118155 A1 | 5/2011 | Pisklak et al. | |
| 2012/0247766 A1* | 10/2012 | Hemmings | C04B 28/021 |
| | | | 166/285 |
| 2012/0325479 A1 | 12/2012 | Muthusamy et al. | |
| 2013/0153222 A1 | 6/2013 | Pisklak et al. | |
| 2013/0233550 A1 | 9/2013 | Brothers et al. | |
| 2013/0248183 A1 | 9/2013 | Pisklak et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Ballew et al. | |
| 2014/0373756 A1 | 12/2014 | Brothers et al. | |
| 2014/0374098 A1 | 12/2014 | Brothers et al. | |
| 2015/0175481 A1 | 6/2015 | Pisklak et al. | |
| 2015/0175869 A1 | 6/2015 | Agapiou et al. | |
| 2015/0197033 A1 | 7/2015 | Agapiou et al. | |
| 2015/0197453 A1 | 7/2015 | Pisklak et al. | |
| 2015/0315875 A1 | 11/2015 | Chatterji et al. | |
| 2015/0322327 A1 | 11/2015 | Chatterji et al. | |
| 2016/0075933 A1 | 3/2016 | Pisklak et al. | |
| 2016/0084037 A1 | 3/2016 | Brothers et al. | |
| 2016/0137902 A1 | 5/2016 | Pisklak et al. | |
| 2016/0186036 A1 | 6/2016 | Pisklak et al. | |
| 2016/0194545 A1 | 7/2016 | Pisklak et al. | |
| 2016/0289531 A1* | 10/2016 | Agapiou | C04B 28/18 |

FOREIGN PATENT DOCUMENTS

| | | |
|---|---|---|
| JP | S61-151057 | 7/1986 |
| JP | 62096355 | 5/1987 |
| JP | H05-208856 | 8/1993 |
| JP | 11001362 | 1/2011 |
| SU | 545615 | 4/1977 |
| SU | 1078032 | 3/1984 |

OTHER PUBLICATIONS

Japanese Office Action and translation for Application No. 2016-541643 dated Aug. 8, 2017.
International Search Report and Written Opinion for International Application No. PCT/US2014/018575 dated Nov. 25, 2014.

\* cited by examiner

HIGH-ALUMINA REFRACTORY ALUMINOSILICATE POZZOLAN IN WELL CEMENTING

BACKGROUND

Embodiments relate to cementing operations and, more particularly, in certain embodiments, to methods and compositions that utilize high-alumina refractory aluminosilicate pozzolans in well cementing.

In cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protect the pipe string from corrosion. Cement compositions also may be used in remedial cementing methods, such as in squeeze cementing for sealing voids in a pipe string, cement sheath, gravel pack, subterranean formation, and the like. Cement compositions may also be used in surface applications, for example, construction cementing.

In order for the cementing operation to be successful, the cement composition should satisfy a number of specific requirements, including rheology, fluid loss, thickening time, and strength development. When used in high temperature wells (e.g., >250° F.), conventional cement compositions comprising Portland cement are known to lose strength after continued exposure to high temperature, a phenomenon commonly referred to as "strength retrogression." It is believed that strength retrogression of Portland cement occurs because the normal bonding phase (calcium hydroxide) is transformed to alpha-dicalcium silicate at elevated temperatures. Strength retrogression may be combated by the addition of silicon dioxide materials to the cement composition, including silica flour or silica sand. While silicon dioxide materials have been used successfully to counteract strength retrogression, it is desired to develop additional cement compositions that can be used at elevated temperatures.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
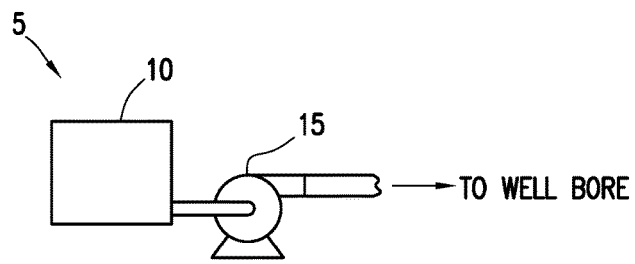
FIG. 1 is a schematic illustration of an example system for the preparation and delivery of a cement composition comprising a high-alumina refractory aluminosilicate pozzolan to a wellbore.

Embodiments relate to cementing operations and, more particularly, in certain embodiments, to methods and compositions that utilize high-alumina refractory aluminosilicate pozzolans in well cementing. Cement compositions comprising a high-alumina refractory aluminosilicate pozzolan may be used in a variety of surface and subterranean cementing applications, including primary and remedial cementing operations. Embodiments of the cement compositions may be used in horizontal, vertical, deviated, or otherwise non-linear wellbores in any type of subterranean formation. Embodiments may be applicable to injection wells, monitoring wells, and production wells, including hydrocarbon or geothermal wells.

Example cement compositions may comprise: cement kiln dust and/or Portland cement; a high-alumina refractory aluminosilicate pozzolan; and water. While the example cement compositions may be suitable for a number of cementing, operations, they may be particularly suitable for use in high temperature wells, including wells having bottom hole static temperatures ("BHST") of about 250° F. or greater. By way of example, the cement compositions may be used in wells with BHST up to about 510° F. or greater. One of the many potential advantages of the present disclosure may be that the cement compositions may maintain strength in high temperature wells, thereby providing an alternative to conventional use of silicon dioxide materials to prevent strength retrogression in cement compositions comprising Portland cement. The high-alumina content of the refractory alumino silicate pozzolan imparts high temperature stability to the cement compositions. For example, when used with Portland cement, calcium aluminosilicates (e.g., Hibshite and Katoite) may be formed at temperatures up to 550° F. which have high temperature stability. Moreover, when used with cement kiln dust, the major components formed may include Mullite and Corundum, which have high temperature stability, with Tobermorite formed at elevated temperatures but not at temperatures below 200° F.

Moreover, the high-alumina refractory aluminosilicate pozzolan and/or the cement kiln dust according to some embodiments may be sourced from inexpensive and commonly available materials providing cost-saving benefits. In some embodiments, either of the high-alumina refractory aluminosilicate pozzolan and/or the cement kiln dust may be recycled and/or waste products, thereby providing environmental benefit through their repurposing. In addition, the capability of cement compositions according to some embodiments to set, in situ may advantageously avoid, the need to use clinker and clinker-derived materials for cementing operations, which could further reduce the environmental impact associated with the cement compositions of such embodiments.

As previously mentioned, the cement compositions may comprise Portland cement. Examples of suitable Portland cements may include those classified as Classes A, B, C, G, or H cements according to American Petroleum Institute, *API Specification for Materials and Testing for Well Cements*, API Specification 10, Fifth Ed., Jul. 1, 1990.

Additional examples of suitable Portland cements may include those classified as ASTM Type I, II, III, IV, or V.

In some embodiments, the cement compositions may comprise cement kiln dust, which be used in combination with or in place of the Portland cement. "Cement kiln dust," as that term is used herein, refers to a solid, material generated as a by-product of the heating of cement raw materials in kilns. The term "cement kiln dust" as used herein is intended to include cement kiln dust made as described herein and equivalent forms of cement kiln dust. Depending on its source, cement kiln dust may exhibit cementitious properties in that it can set and harden in the presence of water. Cement kiln dust may be generated as a by-product of cement production that is removed from the gas stream and collected, for example, in a dust collector. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kiln dust generally may comprise as variety of oxides, such as $SiO_2$, $Al_2O_3$, $Fe_2O_3$, CaO, MgO, $SO_3$, $Na_2O$, and $K_2O$.

The cement composition may further comprise a high-alumina refractory aluminosilicate pozzolan. As used herein, the term "high-alumina refractory aluminosilicate pozzolan" refers to a pozzolan having a ratio of alumina to silica (or A:S) of about 0.7 or greater and derived from a refractory material, such as firebrick. The A:S ratio in some embodiments may be about 1.0 or greater and in certain embodiment may be as high as 17. In other words, the high-alumina refractory aluminosilicate pozzolan may comprise more alumina than silica and, in some embodiments, substantially more alumina than silica. Examples of suitable high-alumina refractory aluminosilicate pozzolans include, but are not limited to, firebrick, firebrick grog, refractory mortar, fire clay, Mullite, fused Mullite, and combinations thereof.

The high-alumina refractory aluminosilicate pozzolan may, in some embodiments, serve as a low-cost supplement to cement compositions that comprise Portland cement. In addition, it has surprisingly been found that a mixture of the high-alumina refractory aluminosilicate pozzolan and cement kiln dust forms a cementitious material without inclusion of any additional materials having hydraulic activity. Except for the minimal amounts of lime that may be present in the cement kiln dust, lime may not need to be used with the high-alumina refractory aluminosilicate pozzolan. In contrast, lime is conventionally used for activation of pozzolans. Moreover, the inclusion of the high-alumina refractory aluminosilicate pozzolan in the cement compositions may result in a cement composition may correspond to greater heat resistant properties. In other words, use of the high-alumina refractory aluminosilicate pozzolan may help to alleviate problems associated with strength retrogression in well cementing. This may in some embodiments be due to species such as Mullite, Corundum, etc. present in the high-alumina content refractory alumino silicate pozzolan. High-alumina refractory aluminosilicate such as firebrick or firebrick grog may impart inherent heat and chemical resistance to a cement composition, including such materials. Table 1 below shows X-ray diffraction CARD) compositional analysis of a high alumina refractory aluminosilicate pozzolan (in Table 1, firebrick grog "FBG") that may be included in cement compositions. Table 2 shows a full oxide analysis of the firebrick grog.

TABLE 1

XRD of Firebrick Grog

| | | FBG |
|---|---|---|
| Quartz | $SiO_2$ | 2% |
| Mullite | $Al_6Si_2O_{13}$ | 69% |
| Corundum | $Al_2O_3$ | 27% |
| Cristobalite | $SiO_2$ | 1% |
| K-feldspar | $KalSi_3O_8$ | 1% |

TABLE 2

Full Oxide Analysis of Firebrick Grog

| | FBG |
|---|---|
| MgO | 0.14% |
| $Al_2O_3$ | 65.91% |
| $SiO_2$ | 22.64% |
| $K_2O$ | 0.55% |
| CaO | 5.53% |
| $TiO_2$ | 2.40% |
| $Mn_2O_3$ | 0.08% |
| $Fe_2O_3$ | 2.59% |
| SrO | 0.04% |
| LOI | 0.11% |

As illustrated in the tables above, the high-alumina refractory aluminosilicate pozzolan may comprise Mullite in an amount of about 30 wt % or greater. By way of example, the high-alumina refractory aluminosilicate pozzolan may comprise Mullite in an amount of about 30 wt %, about 35 wt %, about 40 wt %, about 45 wt %, about 50 wt %, about 55 wt %, about 60 wt %, about 65%, about 70 wt %, or even greater. Even further, the high-alumina refractory aluminosilicate pozzolan may comprise Corundum in an amount of about 10 wt % or greater. By way of example, the high-alumina refractory aluminosilicate pozzolan may comprise Corundum in an amount of about 10 wt %, about 15 wt %, about 20 wt %, about 25 wt %, about 30 wt %, or even greater. Similarly, the high-alumina refractory aluminosilicate pozzolan incorporated into the cement composition according to some embodiments may include substantially no amorphous (non-crystalline) material. The high-alumina refractory aluminosilicate pozzolan may be present in the cement compositions in an amount desired for a particular application. For example, the high-alumina refractory aluminosilicate pozzolan may be present in an amount in a range of from about 10% to about 200% bwoc. As used herein, "bwoc" refers to the amount of a material included in the cement composition by weight of the cement kiln dust and/or Portland cement in the cement composition. In particular embodiments, the high-alumina refractory aluminosilicate pozzolan may be present in the cement compositions in an amount ranging between any of and/or including any of about 10%, about 20%, about 40%, about 60%, about 80%, about 100%, about 120%, about 140%, about 160%, about 180%, or about 200% bwoc. In one particular embodiment, the high-alumina refractory aluminosilicate pozzolan may be present in an amount in a range of from about 50% to about 150% bwoc and, alternatively, from about 80% to 120% bwoc.

Further, the high-alumina refractory aluminosilicate pozzolan may be included in the cement compositions in a crushed, ground, powder, or other suitable particulate form.

In some embodiments, the high-alumina refractory aluminosilicate pozzolan may have a particle size of 4 mesh or smaller. As used herein, all references to mesh are to the U.S. Sieve Series. By way of example, the high-alumina refractory aluminosilicate pozzolan may have as particle size of 4 mesh, 6 mesh, 8 mesh, 10 mesh, 20 mesh, 30 mesh, 40 mesh, 50 mesh, 60 mesh, 70 mesh, 80 mesh, or even smaller. Although embodiments may have no lower limit, as lower limit on the particle size of the high-alumina refractory aluminosilicate pozzolan may be 400 mesh, 200 mesh, 100 mesh, 80 mesh, 40 mesh, 20 mesh, 10 mesh, or even larger. Examples of suitable particle size distributions for the high-alumina refractory aluminosilicate pozzolan may include: −80/+400 mesh; −200/+400 mesh; −30/+100 mesh; −60/+80 mesh; or −18/+80 mesh.

The water used in the example cement compositions may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the cement compositions. The water may be included in an amount sufficient to form a pumpable slurry. For example, the water may be included in the cement compositions in an amount in a range of from about 40% to about 200% bwoc and, alternatively, in an amount in a range of from about 40% to about 150% bwoc. By way of further example, the water may be present in an amount ranging between any of and/or including any of about 40%, about 50%, about 60%, about 70%, about 80%, about 90%, about 100%, about 110%, about 120%, about 130%, about 140%, about 150%, about 160%, about 170%, about 180%, about 190%, or about 200% bwoc. One of ordinary skill in the art, with the benefit of this disclosure, should recognize the appropriate amount of the water to include for a chosen application.

Those of ordinary skill in the art should appreciate, with the benefit of this disclosure, that the cement compositions generally may have a density suitable for a particular application. By way of example, the cement compositions may have a density of about 5 pounds per gallon ("lbs/gal") to about 25 lbs/gal. By way of example, the cement compositions may have a density ranging between any of and/or including any of about 5 lbs/gal, about 10 lbs./gal, about 1.5 lbs/gal about 20 lbs/gal, or about 25 lbs/gal. In certain embodiments, the cement compositions may have a density of about 14 lbs/gal to about 17 lbs/gal. The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Other additives suitable for use in subterranean cementing operations may also be added to the cement compositions as desired for a particular application. Examples of such additives include, but are not limited to, foaming additives, strength-retrogression additives, set accelerators, set retarders, lightweight additives, gas-generating additives, mechanical-property-enhancing additives, lost-circulation materials, fluid-loss-control additives, defoaming additives, thixotropic additives, and any combination thereof. Specific examples of these, and other, additives include perlite, shale, amorphous silica, metakaolin, crystalline silica, tinned silica, silicates, salts, fibers, hydratable clays, microspheres, diatomaceous earth, natural pozzolan, zeolite, ash, rice hull ash, swellable elastomers, any combination thereof, and the like. A person having ordinary skill in the art, with the benefit of this disclosure, will readily be able to determine the type and amount of additive useful for a particular application and desired result.

Optionally, foaming additives may be included in the cement compositions, for example, to facilitate foaming and/or stabilize the resultant foam formed therewith. The foaming additive may include a surfactant or combination of surfactants that reduce the surface tension of the water. As will be appreciated by those of ordinary skill in the art, the foaming additives may be used in conjunction with a gas to produce a foamed cement composition. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates alkyl or alkene amidobetaines such as cocoamidopropyl betaine; alpha-olefin sulfonates; quaternary surfactants such as trimethyl-tallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl beta surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant aqueous solutions of an alpha-olefinic sulfonate surfactant and as betaine surfactant; and combinations thereof. An example of a suitable foaming additive is ZONESEAL-ANT™ 2000 agent, available from Halliburton Energy Services, Inc.

Optionally, strength-retrogression additives may be included the cement composition, for example, to further prevent the retrogression of strength as the cement composition has been allowed to develop compressive strength when the cement composition is exposed to high temperatures. Due to inclusion of the firebrick grog in the example cement compositions described herein the strength-retrogression additives may not be needed in certain applications. These additives may allow the cement compositions to form as intended, preventing cracks and premature failure of the cementitious composition. Examples of suitable strength-retrogression additives may include, but are not limited to amorphous silica, coarse grain crystalline silica, fine grain crystalline silica, or a combination thereof.

Optionally, set accelerators may be included in the cement compositions, for example, to increase the rate of setting reactions. Control of setting time may allow for the ability to adjust to wellbore conditions or customize set times for individual jobs. Examples of suitable set accelerators may include, but are not limited, to, aluminum sulfate, alums, calcium chloride, calcium sulfite, gypsum-hemihydrate, sodium aluminate, sodium carbonate, sodium chloride, sodium silicate, sodium sulfate, ferric chloride, or a combination thereof.

Optionally, set retarders may be included in the cement compositions, for example, to increase the thickening time of the cement compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises is sulfomethylated lignin.

Optionally, lightweight additives may be included in the cement compositions, for example, to decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the cement compositions to release gas at a predetermined time which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the cement compositions, for example, to ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the cement compositions, for example, to help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, melamine laminates (e.g., Formica® laminate), corncobs, cotton hulls, and combinations thereof.

Optionally, fluid-loss-control additives may be included in the cement compositions, for example, to decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, defoaming additives may be included in the cement compositions, for example, to reduce tendency for the cement composition to foam during mixing and pumping of the cement compositions. Examples of suitable defoaming additives include, but are not limited to, polyol silicone compounds. Suitable deforming additives are available from Halliburton Energy Services, Inc., under the product name D-AIR™ defoamers.

Optionally, thixotropic additives may be included in the cement compositions, for example, to provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or as combination thereof.

The components of the cement compositions may be combined in any order desired to form a cement composition that can be placed into a subterranean formation. In addition, the components of the cement compositions may be combined using any mixing device compatible with the composition, including a bulk mixer, for example. In one particular example, a cement composition may be prepared by combining the dry components (which may be the Portland cement/cement kiln dust and the high-alumina refractory aluminosilicate pozzolan, for example) with water. Liquid additives (if any) may be combined with the water before (or after) the water is combined, with the dry components. The dry components may be dry blended prior to their combination with the water. For example, a dry blend may be prepared that comprises the high-alumina refractory aluminosilicate pozzolan and the Portland cement/cement kiln dust. Other suitable techniques may be used for preparation of the cement compositions as will be appreciated by those of ordinary skill in the art in accordance with example embodiments.

After placement in the subterranean formation, the cement compositions comprising Portland cement/cement kiln dust, the high-alumina refractory aluminosilicate pozzolan, and water may set to have a desirable compressive strength for well cementing. As used herein, the term "set," "setting," or "settable" refers to the process of a material such as a cement composition hardening from a slurry state to a solidified state and/or the ability for the cement composition to exhibit such hardening. For example, "setting" may refer to a cement composition hardening due at least in part to hydration (or pozzolanic) reactions in the presence of water. In some embodiments, setting may be particular to placement of a cement composition in suitable conditions (e.g., suitable temperatures and/or pressures). Such placement may be in a subterranean formation, in accordance with some embodiments. In some embodiments, setting may be delayed by use of appropriate set retarders.

Compressive strength is generally the capacity of a material or structure to withstand axially directed pushing forces. The compressive strength may be measured at a specified time after the cement compositions have been positioned and the cement compositions are maintained under specified temperature and pressure conditions. Compressive strength can be measured by either a destructive method or non-destructive method. The destructive method physically tests the strength of cement composition samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strengths may be determined in accordance with API RP 10B-2, *Recommended Practice for Testing Well Cements*, First Edition, July 2005.

By way of example, the cement compositions comprising Portland cement/cement kiln dust, the high-alumina refractory aluminosilicate pozzolan may develop a 24-hour compressive strength in the range of from about 50 psi to about 5000 psi, alternatively, from about 100 psi to about 4500 psi, or alternatively from about 500 psi to about 4000 psi. In some embodiments, the cement compositions may develop a compressive strength in 24 hours of about 50 psi, about 100 psi, about 500 psi, or even higher. In some embodiments, the compressive strength values may be determined using destructive or non-destructive methods at a temperature ranging from 100° F. to 200° F. Moreover, embodiments of the cement compositions may maintain compressive strengths even at elevated temperatures. By way of example, the cement compositions may have 7-day compressive strengths at temperatures as high as 550° F. of about 3000 psi, about 4000 psi, or even higher.

The cement compositions comprising Portland cement/cement kiln dust, the high-alumina refractory aluminosilicate pozzolan, and water may be used in a variety of subterranean cementing applications, including primary and remedial cementing. By way of example, a cement composition may be provided that comprises Portland cement/cement kiln dust, a high-alumina refractory aluminosilicate pozzolan, and water. Additional additives may also be included as described above. The concentration and amounts of the components of the cement composition are described above. The cement composition may be introduced into a subterranean formation and allowed to set therein. As used herein, introducing the cement composition into a subterranean formation includes introduction into any portion of the subterranean formation, including, without limitation, into as wellbore drilled, into the subterranean formation, into a near wellbore region surrounding the wellbore, or into both.

Where used in primary cementing, for example, the cement composition may be introduced into an annular space between a conduit (e.g., a casing) located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

Where used in remedial cementing, a cement composition may be used, for example, in squeeze-cementing operations or in the placement of cement plugs. By way of example, the cement composition may be placed in a wellbore to plug an opening (e.g., a void, or crack) in the formation, in a gravel pack, in the conduit, in the cement sheath, and/or between the cement sheath and the conduit (e.g., a microannulus).

An embodiment may comprise a method of cementing comprising: introducing a cement composition into a subterranean formation, wherein the cement composition comprises: a component selected from the group consisting of cement kiln dust, Portland cement, and any combination thereof; a high-alumina refractory aluminosilicate pozzolan; and water; and allowing the cement composition to set. The components of the cement composition and various concentrations thereof that may be used are described previously with respect to the example embodiments.

An embodiment may comprise a cement composition comprising: a component selected from the group consisting of cement kiln dust, Portland cement, and any combination thereof; a high-alumina refractory aluminosilicate pozzolan; and water. The components of the cement composition and various concentrations thereof that may be used are described previously with respect to the example embodiments.

An embodiment may comprise a system for well cementing comprising: a cement composition comprising: a component selected from the group consisting of cement kiln dust, Portland cement, and any combination thereof; a high-alumina refractory aluminosilicate pozzolan; and water mixing equipment for mixing the cement composition; and pumping equipment for delivering the cement composition to wellbore. The components of the cement composition and various concentrations thereof that may be used are described previously with respect to the example embodiments.

Figure 2:
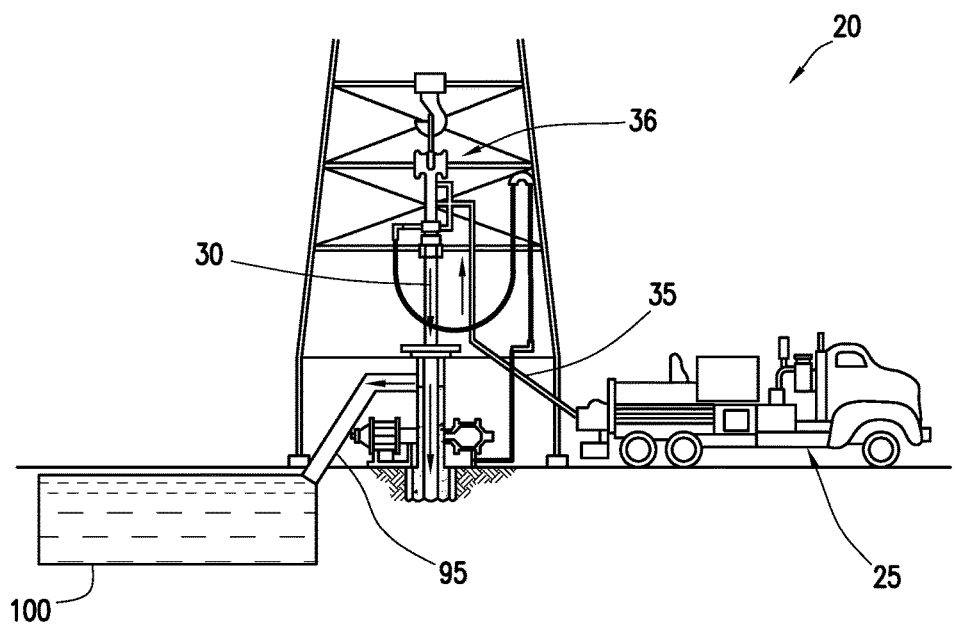
FIG. 2 is a schematic illustration of example surface equipment that may be used in the placement of a cement composition comprising a high-alumina refractory aluminosilicate pozzolan into a wellbore.

Example methods of using the high-alumina refractory aluminosilicate pozzolan in well cementing will now be described in more detail with reference to FIGS. 1-3. FIG. 1 illustrates an example system 5 for preparation of a cement composition comprising Portland cement/cement kiln dust, the high-alumina refractory aluminosilicate pozzolan, and water and delivery of the cement composition to a wellbore. As shown, the cement composition may be mixed in mixing equipment 10, such as jet mixer, re-circulating mixer, or a batch mixer, for example, and then pumped via pumping equipment 15 to the wellbore. In some embodiments, the mixing equipment 10 and the pumping equipment 15 may be disposed on one or more cement trucks as will be apparent to those of ordinary skill in the art. In some embodiments, as jet mixer may be used, for example, to continuously mix a dry blend comprising the Portland cement/cement kiln dust and the high-alumina refractory aluminosilicate pozzolan, for example, with the water as it is being pumped to the wellbore.

An example technique for placing a cement composition into a subterranean formation will now be described with reference to FIGS. 2 and 3. FIG. 2 illustrates example surface equipment 20 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement composition 30, which may comprise water, Portland cement/cement kiln dust, and the high-alumina refractory aluminosilicate pozzolan, through a feed pipe 35 and to a cementing bead 36 which conveys the cement composition 30 downhole.

Figure 3:
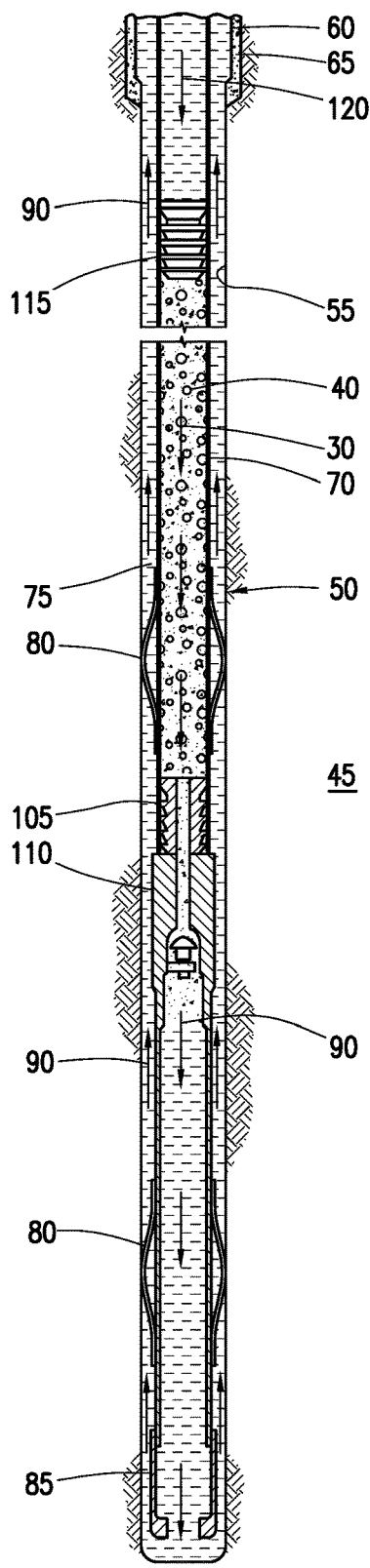
FIG. 3 is a schematic illustration of the example placement of a cement composition comprising a high-alumina refractory aluminosilicate pozzolan into a wellbore annulus.

Turning now to FIG. 3, the cement composition 30, which may comprise Portland cement/Cement kiln dust, high-alumina refractory aluminosilicate pozzolan waste, and water, may be placed into a subterranean formation 45 in accordance with example embodiments. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 comprises walls 55. In the illustrated embodiment, a surface casing 60 has been inserted into the wellbore 50. The surface casing 60 may be cemented to the walls 55 of the wellbore 50 by cement sheath 65. In the illustrated embodiment, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement composition 30 may be pumped down the interior of the easing 70. The cement composition 30 may be allowed to flow down the interior of the casing 70 through the casing shoe 85 at the bottom of the casing 70 and up around the casing 70 into the wellbore annulus 75. The cement composition 30 may be allowed to set in the wellbore annulus 75, for example, to form a cement sheath that supports and positions the casing 70 in the wellbore 50. While not illustrated, other techniques may also be utilized for introduction of the cement composition 30. By way of example, reverse circulation techniques may be used that include introducing the cement composition 30 into the subterranean formation 45 by way of the wellbore annulus 75 instead of through the casing 70.

As it is introduced, the cement composition 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., at mud pit), as shown on FIG. 2. Referring again to FIG. 3, a bottom plug 105 may be introduced into the wellbore 50 ahead of the cement composition 30, for example, to separate the cement composition 30 from the other fluids 90 that may be inside the casing 70 prior to cementing. After the bottom plug 105 reaches the landing collar 110, a diaphragm or other suitable device should rupture to allow the cement composition 30 through the bottom plug 105. In FIG. 3, the bottom plug 105 is shown on the landing collar 110. In the illustrated embodiment, a top plug 115 may be introduced into the wellbore 50 behind the cement composition 30. The top plug 115 may separate the cement composition 30 from a displacement fluid 120 and also push the cement composition 30 through the bottom plug 105.

The exemplary high-alumina refractory aluminosilicate pozzolan herein may directly or indirectly affect one or more components or pieces of equipment associated with the preparation, delivery, recapture, recycling, reuse, and/or disposal of the high-alumina refractory aluminosilicate pozzolan and associated cement compositions. For example, the high-alumina, refractory aluminosilicate pozzolan may directly or indirectly affect one or more mixers, related mixing equipment 15, mud pits, storage facilities or units, composition, separators, heat exchangers, sensors, gauges, pumps, compressors, and the like used generate, store, monitor, regulate, and/or recondition the exemplary high-alumina refractory aluminosilicate pozzolan and fluids containing the same. The disclosed high-alumina refractory aluminosilicate pozzolan may also directly or indirectly affect any transport or delivery equipment used to convey the high-alumina refractory aluminosilicate pozzolan to a well site or downhole such as, for example, any transport vessels, conduits, pipelines, trucks, tubulars, and/or pipes used to compositionally move the high-alumina refractory aluminosilicate pozzolan from one location to another, any pumps, compressors, or motors (e.g., topside or downhole) used to drive the high-alumina refractory aluminosilicate pozzolan, or fluids containing the same, into motion, any valves or related joints used to regulate the pressure or flow rate of the high-alumina refractory aluminosilicate pozzolan (or fluids containing the same), and any sensors (i.e., pressure and temperature), gauges, and/or combinations thereof, and the like. The disclosed high-alumina refractory aluminosilicate pozzolan may also directly or indirectly affect the various downhole equipment and tools that may come into contact with the high-alumina refractory aluminosilicate pozzolan such as, but not limited to, wellbore casing 70, wellbore liner, completion string, insert strings, drill string, coiled tubing, slickline, wireline, drill pipe, drill collars, mud, motors, downhole motors and/or pumps, cement pumps, surface-mounted motors and/or pumps, centralizers 80, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control device (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill hits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present invention, the following examples of some of the preferred embodiments are given. In no way should such examples be read to limit, or to define, the scope of the invention.

Example 1

The following series of tests were performed to evaluate the mechanical properties of the cement compositions comprising a high-alumina refractory aluminosilicate pozzolan and Portland cement. A sample cement composition (designated Sample 1) having a density of 16.6 lbs/gal was prepared that comprised firebrick grog and Class G Portland Cement, mixed in a weight ratio of 1:1, with water in an amount of 70% bwoc. The firebrick grog was High Duty Firebrick Grog, available from Alsey Refractories Co. A particle size analysis of the firebrick grog showed a d50 of 160 microns. This sample cement composition was prepared by adding the Portland cement to the water in a blender pitcher while stirring at 4000 rpm, followed by addition of the firebrick grog to the resulting slurry at 4000 rpm. After addition of the solids was complete, the slurry was stirred in the blender at 4000-6000 rpm for 1 minute. The slurry was then transferred to 2" by 4" cylindrical curing molds, sealed, and placed in a 190° F. water bath. The samples were cured for 24 hours and 7 days at 190° F. under ambient conditions and then removed for compressive strength measurements. Another set of samples was cured for 24 hours at 190° F. and then transferred to an autoclave and cured further at 550° F. for 7 days at 2000 psi. After setting, the destructive compressive strengths were determined using a mechanical press in accordance with API RP 10B-2.

The results from these tests (Table 3) indicate that strength retrogression did not occur at high temperatures. As shown, the compressive strength after 24 hours at 190 ambient, was 1533 psi and after 7 days at 190° F. was 3363 psi. Interestingly, the samples exposed to 550° F. for 7 days did not lose strength at such high temperatures, as would be expected with Portland cement. The data in the table below is an average of two tests for each sample.

TABLE 3

Sample 1 Compressive Strength Testing

| Material | Amount (% bwoc) | Mass (g) |
|---|---|---|
| Water | 70 | 283 |
| Firebrick Grog | 100 | 400 |
| Class G Portland Cement | 100 | 400 |
| 24-Hr Comp. Strength @ 190° F. (psi) | 1533.11 | |
| 7-Day Comp. Strength @ 550° F. (psi) | 3363.1 | |
| 7-Day Comp. Strength @ 190° F. (psi) | 3217.31 | |

XRD compositional analysis (Table 4) based on XRD diffraction patterns showed that curing at high temperatures (550° F.) led to composition changes in the cement compositions as compared to those set at lower temperatures (190° F.). As shown, the XRD analysis at low temperatures showed a significant presence of Mullite as well as the presence of Portlandite and other materials derived from the Portland cement in small amounts. However, when cured at 550° F. much of the Mullite was consumed and the calcium aluminosilicates Hibschite and Katoite were formed as the major constituents. The amounts of the Corundum were also increased for the high-temperature sample and no Portlandite was present. These are the species generated by the presence of the firebrick grog in the sample compositions.

TABLE 4

XRD Analysis of Cured Sample 1

| | | Cured at 190° F., 24 Hours | Cured at 190° F., 7 Days | Cured at 550° F., 7 Days |
|---|---|---|---|---|
| Mullite | $Al_6Si_2O_{13}$ | 64% | 66% | 10-15% |
| Corundum | $Al_2O_3$ | 2% | 2% | 8-12% |
| Quartz | $SiO_2$ | 2% | 2% | — |
| Cristobalite | $SiO_2$ | 1% | 1% | — |
| Calcite | $CaCO_3$ | 2% | 2% | 2-5% |
| Hatrurite | $(C_3S)$ | 3% | 4% | 2-5% |
| Larnite | $(C_2S)$ | 8% | 6% | ~1% |
| Brownmillerite | $(C_4AF)$ | 8% | 9% | — |
| Portlandite | $Ca(OH)_2$ | 10% | 8% | — |
| Hibschite | $Ca_3Al_2(SiO_{12})_3(OH)_4$ | — | — | 25-25% |
| Katoite | $Ca_3Al_2(SiO_{12})_3(OH)_4$ | — | — | 15-25% |
| Unknown | Unidentified | — | — | 15-25% |

Example 2

The following series of tests were performed to evaluate the mechanical properties of the cement compositions comprising a high-alumina refractory aluminosilicate pozzolan kind cement kiln dust. A sample cement composition (designated Sample 2) having a density of 16.2 lbs/gal was prepared that comprised firebrick grog and cement kiln dust, mixed in a weight ratio of 1:1, with water in an amount of 55% by weight of the cement kiln dust. The firebrick grog was High Duty Firebrick Grog, available from Alsey Refractories Co. A particle size analysis of the firebrick grog showed a d50 of 160 microns. The cement kiln dust was supplied from the Holcim (US) Ada cement plant. This sample cement composition was prepared by dr blending the firebrick grog and the cement kiln dust in a jar and then adding the dr blend to water in a blender pitcher while stirring at 4000 rpm. A polycarboxylate-based dispersant (Liquiment® 5581F, available from BASF Global Oilfield Solutions) was added while mixing the dry blend with the water to facilitate mixing and wetting of the solids. After the addition of the solids was complete, the slurry was stirred in the blender at 4000-6000 rpm for 1 minute. The slurry was then transferred to 2" by 4" cylindrical curing molds, sealed, and placed in as 190° F. water bath. The samples were cured for 24 hours and 7 days at 190° F. under ambient conditions and then removed for compressive strength measurements. Another set of samples was cured for 24 hours at 190° F. and then transferred to an autoclave and cured further at 550° F. for 7 days at 2000 psi. After setting, the destructive compressive strengths were determined using a mechanical press in accordance with API RP 10B-2.

The results from these tests are shown in Table 5 below. As shown, the compressive strength after 24 hours at 190° F. ambient, was 1939 psi and after 7 days at 190° F. was 4147 psi. Interestingly, the results indicate that the samples exposed to 550° F. for 7 days did not have a lower compressive strength than the samples cured at 190° F. for 24 hours. The data is an average of two tests for each sample.

TABLE 5

Sample 2 Compressive Strength Testing

| Material | Amount (% bwoCKD) | Mass (g) |
|---|---|---|
| Water | 55 | 221.33 |
| Firebrick Grog | 100 | 400 |
| Cement Kiln Dust | 100 | 400 |
| Dispersant | 0.75 | 3 |
| 24-Hr Comp. Strength @ 190° F. (psi) | 1938.58 | |
| 7-Day Comp. Strength @ 550° F. (psi) | 1984.13 | |
| 7-Day Comp. Strength @ 190° F. (psi) | 4146.61 | |

To further evaluate these compositions, another sample cement composition (designated Sample 3) comprising firebrick grog and cement kiln dust was subjected to tests using a UCA™ ultrasonic cement analyzer, available from Fann Instrument Company, as well as compressive strength by crushing the samples. The sample cement composition had a density of 15.7 lbs/gal and comprised firebrick grog and cement kiln dust, mixed in a weight ratio of 1:1, with water in an amount of 65% bwoc kiln dust. The sample cement composition was prepared as described above and half the slurry was transferred to the UCA™ ultrasonic cement analyzer, while the other half was transferred to 1" by 2" brass cylinder molds for curing. The samples in the brass cylinder molds were sealed and placed in a 190° F. water bath for either 24 hours or 7 days and then crushed using a mechanical press in accordance with API RP 10B-2 to determine the destructive compressive strength. The test conditions for the samples placed in the UCA™ ultrasonic cement analyzer were 500° F. and 3000 psi. The compressive strength development was monitored with the UCA™ ultrasonic cement analyzer for 7 days after which the sample cement composition was removed and crushed with a mechanical press in accordance with API RP 10B-2, to determine the compressive strength.

Figure 4:
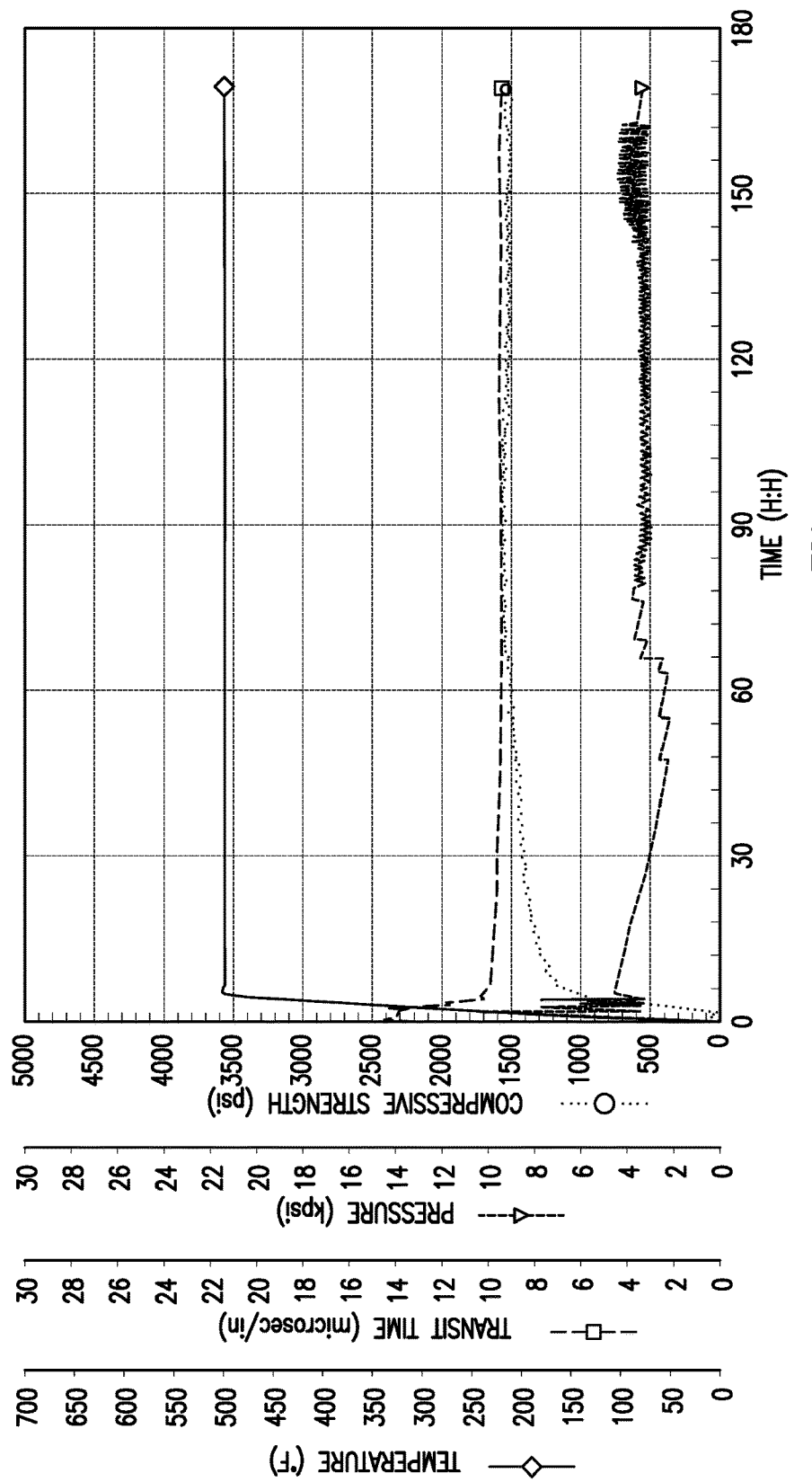
FIG. 4 illustrates the development of compressive strength over time for an example cement composition comprising a high-alumina refractory aluminosilicate pozzolan.

The results from these additional tests (Table 6) indicate that the samples exposed to elevated temperatures did not experience strength retrogression. As shown, the compressive strengths for the samples tested with the brass cylinder molds after 24 hours at 190° F. ambient, was 1021 psi and after 7 days at 190° F. was 3183 psi. The lower compressive strengths for these samples as opposed to those in Table 5 above may be due to the increased water content. The measurements from the UCA™ ultrasonic cement analyzer correlated well with the crush measurements. The 24-hour measurement from the UCA™ ultrasonic cement analyzer was 1382 psi, and the sample cement composition from the UCA™ ultrasonic cement analyzer was crushed after 7 days to give 3351 psi. Moreover, the sample cement composition in the UCA™ ultrasonic cement analyzer rapidly gained strength, achieving 50 psi in 43 minutes and 500 psi in 3 hours and 17 minutes. Moreover, the compressive strength profile showed no loss in strength over the 17-day test period at 500° F., FIG. 4 displays a plot of the compressive strength development for the test using the UCA™ ultrasonic cement analyzer.

TABLE 6

Sample 3 Compressive Strength Testing

| Material | Amount (% bwoCKD) | Mass (g) |
|---|---|---|
| Water | 65 | 130 |
| Firebrick Grog | 100 | 200 |
| Cement Kiln Dust | 100 | 200 |
| Dispersant | 1.5 | 3 |
| Mechanical Press Samples | | |
| 24-Hr Comp. Strength @ 190° F. (psi) | 1020.79 | |
| 7-Day Comp. Strength @ 190° F. (psi) | 3183.07 | |
| UCA ™ Samples | | |
| Time to 50 psi (hr:min:sec) | 00:42:30 | |
| Time to 500 psi (hr:min:sec) | 03:16:30 | |
| 24-Hour Comp. Strength (psi) | 1382 | |
| UCA ™ 7-Day Comp. Strength (psi)[1] | 3351.07 | |

[1]The 7-day compressive strength for the sample on the UCA ™ ultrasonic cement analyzer was the crush strength determined using a mechanical press after removing the sample from the analyzer.

XRD compositional analysis (Table 7) based on XRD diffraction patterns showed that Samples 2 and 3 both have Mullite, Corundum, and Calcite as the major constituents. As illustrated, the high-temperature calcium aluminosilicate phase (Tobermorite) is formed in significant quantities in both samples treated at elevated temperatures (550° F.). Mullite and Corundum are present across all the temperature ranges as a result of their high temperature stability and are not lost in significant quantities even at 550° F. The calcite present is derived from the cement kiln dust. The lack of certain species in Sample 3 as compared in Sample 2 may be explained, due to the inherent variability in cement kiln dust. It should also be noted that neither Portlandite nor amorphous CSH is present in Samples 2 and 3. Overall, aside from the formation of Tobermorite, the samples remain relatively unchanged when cured at high temperatures.

TABLE 7

XRD Analysis of Cured Samples 2 and 3

| | | Sample 2 | | | Sample 3 | | |
|---|---|---|---|---|---|---|---|
| | | 190° F., 24 Hrs | 190° F., 7 Days | 550° F., 7 Days | 190° F., 24 Hrs | 190° F., 7 Days | 550° F., 7 Days |
| Mullite | $Al_6Si_2O_{13}$ | 47% | 49% | 43% | 48% | 46% | 40% |
| Corundum | $Al_2O_3$ | 14% | 15% | 17% | 18% | 16% | 16% |
| Quartz | $SiO_2$ | 5% | 5% | 2% | 5% | 5% | — |
| Cristobalite | $SiO_2$ | 1% | trace | — | trace | 1% | — |
| Calcite | $CaCO_3$ | 22% | 23% | 14% | 29% | 31% | 26% |
| Hatrurite | $(C_3S)$ | 2% | 2% | 3% | — | — | — |
| Larnite | $(C_2S)$ | trace | — | — | — | — | — |
| Brownmillerite | $(C_4AF)$ | 3% | 5% | 3% | — | — | — |
| Portlandite | $Ca(OH)_2$ | 1% | — | — | — | — | — |
| Ettringite | $Ca_6Al_2(SO_4)_3(OH)_{12}24H_2O$ | 5% | 1% | — | — | — | — |
| Tobermorite | $Ca_2Si_3O_8 3H_2O$ | — | — | 16% | — | — | 18% |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined, with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
introducing a cement composition into a subterranean formation, wherein the cement composition comprises: a component selected from the group consisting of cement kiln dust, and any combination thereof; a high-alumina refractory aluminosilicate pozzolan; and water, wherein the high-alumina refractory aluminosilicate pozzolan comprises Mullite in an amount of about 30 weight % or greater, wherein the high-alumina refractory aluminosilicate pozzolan comprises Corundum in an amount of about 10 weight % or greater, and wherein high-alumina refractory aluminosilicate pozzolan is substantially devoid of amorphous material; and allowing the cement composition to set.

2. The method according to claim 1, wherein the component comprises the cement kiln dust.

3. The method according to claim 1, wherein the high-alumina refractory aluminosilicate pozzolan comprises a compound selected from firebrick, firebrick grog, refractory mortar, fire clay, Mullite, fused Mullite, and any combination thereof.

4. The method according to claim 1, wherein the high-alumina refractory aluminosilicate pozzolan is present in an amount of about 50% to about 150% by weight of the component.

5. The method according to claim 1, wherein the cement composition further comprises at least one additive selected from the group consisting of a foaming additive, a strength-retrogression additive, a set accelerator, a set retarder, a lightweight additive, a gas-generating additive, a mechanical-property-enhancing additives, a lost-circulation material, a fluid loss control additive, a foaming additive, a defoaming additive, a thixotropic additive, and any combination thereof.

6. The method according to claim 1, wherein the cement composition is introduced into a well bore annulus between a pipe string disposed in the subterranean formation and a wellbore wall or between the pipe string and a larger conduit disposed in the subterranean formation.

7. The method according to claim 1, wherein the cement composition is used in a primary cementing operation.

8. The method according to claim 1, wherein the cement composition is used in a remedial cementing operation.

9. The method according to claim 1, wherein the cement composition is introduced through a casing and into a wellbore annulus using one or more pumps.

10. The method according claim 1, wherein the cement composition is allowed to set at a temperature of about 250° F. or greater.

11. A system for well cementing in high temperature wells comprising:
a cement composition comprising: a component selected from the group consisting of cement kiln dust, and any combination thereof; a high-alumina refractory aluminosilicate pozzolan; and water, wherein the high-alumina refractory aluminosilicate pozzolan comprises Mullite in an amount of about 30 weight % or greater, wherein the high-alumina refractory aluminosilicate pozzolan comprises Corundum in an amount of about 10 weight % or greater, and wherein high-alumina refractory aluminosilicate pozzolan is substantially devoid of amorphous material;
mixing equipment for mixing the cement composition; and
pumping equipment for delivering the cement composition to a wellbore, wherein the wellbore has a temperature of about 250° F. or greater.

12. The system according to claim 11, wherein the component comprises the cement kiln dust.

13. The system according to claim 11, wherein the high-alumina refractory aluminosilicate pozzolan comprises a compound selected from firebrick, firebrick grog, refractory mortar, fire clay, Mullite, fused Mullite, and any combination thereof, and wherein the high-alumina refractory aluminosilicate pozzolan is present in an amount of about 50% to about 150% by weight of the component.

14. A method of cementing comprising:
pumping a cement composition into a wellbore annulus formation, wherein the cement composition comprises cement kiln dust, a high-alumina refractory aluminosilicate pozzolan; and water, wherein the high-alumina refractory aluminosilicate pozzolan comprises a Mullite and is present in an amount of about 50% to about 150% by weight of the component, wherein the high-alumina refractory aluminosilicate pozzolan comprises the Mullite in an amount of about 30 weight or greater, wherein the high-alumina refractory aluminosilicate pozzolan comprises Corundum in an amount of about 10 weight % or greater, and wherein high-alumina refractory aluminosilicate pozzolan is substantially devoid of amorphous material; and
allowing the cement composition to set in the wellbore annulus, wherein the cement composition has a compressive strength ranging from about 500 psi to about 4,000 psi.

15. The method according to claim 14, wherein the wellbore annulus is between a pipe string disposed in the subterranean formation and a wellbore wall and/or between the pipe string and a larger conduit disposed in the subterranean formation.

16. The method according claim 1, wherein the wellbore annulus has a temperature of about 250° F. or greater.

* * * * *